United States Patent [19]
Londergan et al.

[11] Patent Number: 5,111,097
[45] Date of Patent: May 5, 1992

[54] ROTOR POLE CROSSOVER

[75] Inventors: Mark B. Londergan, Orlando; Albert C. Sismour, Jr., Casselberry, both of Fla.; John E. Richardson, Alexandria, Va.

[73] Assignee: Westinghouse Electric Corp., Pittsburgh, Pa.

[21] Appl. No.: 621,119

[22] Filed: Nov. 30, 1990

[51] Int. Cl.⁵ .................... H02K 56/00; H92K 41/00
[52] U.S. Cl. ................................. 310/261; 310/270; 310/179; 310/71; 174/86
[58] Field of Search .............. 310/261, 270, 216, 66, 310/67 R, 179, 71, 90.5; 439/32, 33, 10; 174/99 E, 86, 13

[56]         References Cited
        U.S. PATENT DOCUMENTS
4,633,201  12/1986  Ruff ........................... 333/106
5,015,622   5/1991  Ward et al. .................. 310/90.5

OTHER PUBLICATIONS

Blueprint of conventional "laminated" crossover dated 1982, 1983, No. 2226F59.
Photo of "laminated" crossover installed in generator.

Primary Examiner—Peter S. Wong
Assistant Examiner—Matt Nguyen

[57]            ABSTRACT

A generator rotor pole crossover including a substantially U-shaped portion from which extend legs curving outwardly. The U-shaped portion is thickened in one direction but thinned in another direction, relative to the leg thickness. This configuration provides flexibility to the crossover, decreased stress and relatively constant cross section of resistance purposes. The legs are brazed to the copper conductor winding ends by scarf and lap joints, respectively. The crossover may replace defective crossovers in the field by removing only the end plate of the generator. This allows installation in a short time without risk of damage to generator insulation.

11 Claims, 2 Drawing Sheets

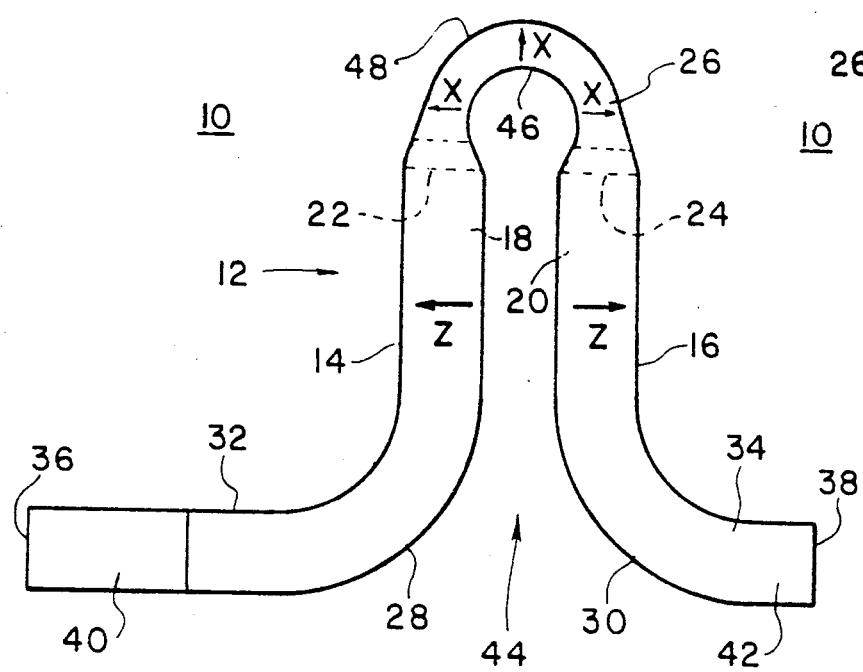
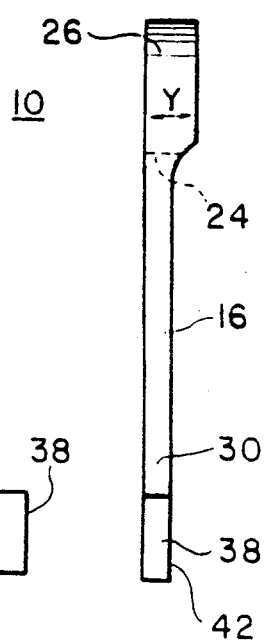
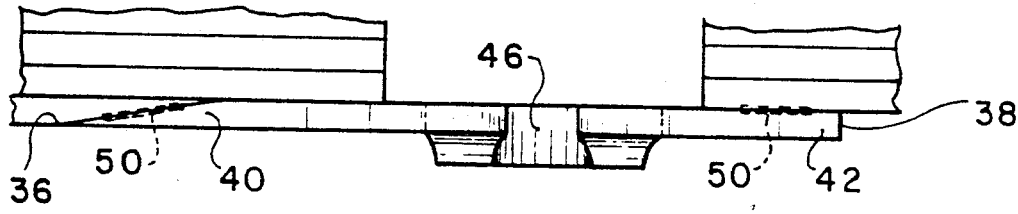
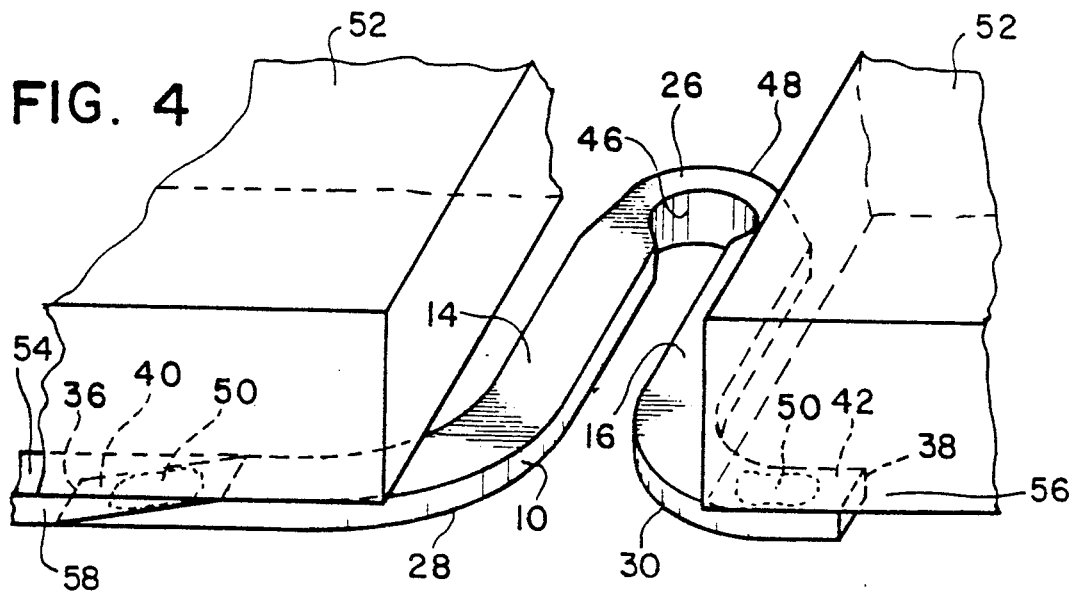

ROTOR POLE CROSSOVER

BACKGROUND OF THE INVENTION

A generator includes a shaft and a rotor body attached to the shaft and containing a plurality of poles. The number of poles is dictated by the speed at which the shaft will be turning and the frequency of the electric current to be produced.

Copper wire is wound on the poles and is referred to as the winding. The wire, in the case of large generators, is composed of flat, stiff, coiled copper bars, each roughly 1 inch by 0.25 inches in cross section, known as conductors.

The winding needs to form a complete circuit from the time it enters the first pole to the time it exits the last pole. Since the winding is made of such a stiff material in large generators, it is convenient to connect ends of the winding between adjacent poles with jumpers known as rotor pole crossovers.

Crossovers have taken many shapes and sizes as designs and needs have changed. For example, rings encircling the shaft, or shorter crossovers in the form of flat plates or reverse S-shapes oriented to lie axially relative to the shaft, have been used.

During operation of the generator, great centrifugal forces are exerted on, among other things, the winding and the crossovers. Further, the crossovers undergo stressful cyclic duty. That is, the generators may be started up and shut down on daily cycles to accommodate peak and off peak electrical generation demands, respectively.

Known crossovers have been found to suffer from a lack of flexibility. As a result, they crack under the centrifugal forces and cyclic duty encountered during use of the generator. Some crossovers actually crack all the way through. Cracked-through crossovers will cause a loss of generator electrical field.

Repairing a cracked crossover requires returning the generator to the factory, removing an end plate and retaining ring of the generator, replacing the cracked crossover with a new crossover, and re-attaching the retaining ring and end plate. Further, blocking used in the generator may have to be modified. These steps significantly increase cost and down time of the generator and perhaps the system with which it is used.

Further, electrical requirements necessitate insulation of the copper winding from the inward shaft and from the outward retaining ring of the generator. The insulation used in machines of 1950 vintage can be irreparably damaged by the removal of the end plate and retaining ring for crossover replacement. Damage to the insulation renders the generator useless and requires that the generator be disassembled entirely and rewound. Rewinding is very expensive and amounts to a lengthy in-factory process.

There is also known a laminated crossover having a U-shaped portion with two leg extensions. This crossover connects to the winding ends via respective lap joints at the free ends of the legs.

This crossover differs from the flat plates or reverse S-shape crossovers discussed above, in that the installed laminated crossover extends radially outward with respect to the shaft, as opposed to being oriented axially with respect to the shaft. This laminated crossover cannot mechanically be configured to be installed axially. That is, if the lap joints are connected to the winding ends, any attempt to rotate the laminated crossover to be oriented axially would exert a great load on the laminations and they would buckle.

With this laminated crossover, as with the other crossovers described above, cracking is still a problem and replacement thereof requires that the generator be returned to the factory, the retaining ring and end plate removed and blocking modified. As noted above, this increases maintenance costs, down time and potentially damages generator parts, particularly the insulation. As such, the laminated version appears applicable only to new generator manufacture or rewinds, not to on-site replacement.

SUMMARY OF THE INVENTION

Accordingly, it is a purpose of the present invention to provide a rotor pole crossover that is more reliable than conventional crossovers.

It is another purpose of the present invention to provide a rotor pole crossover oriented axially relative to the shaft of the generator and having greater flexibility and reduced stress than known crossovers.

It is another purpose of the present invention to provide a rotor pole crossover which has variable thickness to create flexibility and has lower concentrated stress than those of the prior art, thereby eliminating cracking problems.

It is another purpose of the present invention to provide a rotor pole crossover which significantly decreases the amount of generator disassembly required for crossover replacement, thereby making on-site crossover replacement possible.

It is also a purpose of the present invention to provide a rotor pole crossover which can be more easily replaced without damage to the rest of the generator.

To achieve the foregoing, and other purposes of the present invention, there is provided a rotor pole crossover which has a substantially U-shaped portion from which two legs curve outwardly. Relative to the leg thickness, the crossover is thinned in one direction, but is thickened in another direction, to create flexibility and reduce stress, and yet maintain a constant cross sectional area for proper electrical conduction. After an original crossover is removed from the generator, the crossover of the present invention is oriented axially relative to the shaft and the crossover is brazed to the existing winding ends via scarf and lap joints, respectively, formed at the ends of the legs.

This rotor pole crossover combines an optimum cross-section for better flexibility, reduced stress and improved cyclic duty with the ability to be installed in the field with no modification to the generator. The crossover may be replaced by removing only the end plate of the generator. This allows installation in a shorter time and without damage to generator insulation.

Other features and advantages of the present invention will be apparent from the following description taken in conjunction with the accompanying drawings, in which like reference characters designate the same or similar parts throughout the FIGURES thereof.

BRIEF DESCRIPTION OF THE DRAWINGS

The accompanying drawings, which are incorporated in and constitute a part of the specification, illustrate embodiments of the invention and, together with the description, serve to explain the of the invention.

FIG. 1 is a top view of a rotor pole crossover according to the present invention;

FIG. 2 is a right side view of the crossover shown in FIG. 1;

FIG. 3 is a front view of the crossover according to the present invention joined to the winding ends;

FIG. 4 is a perspective view of the crossover according to the present invention joined to the winding ends via scarf and lap joints;

DESCRIPTION OF THE PREFERRED EMBODIMENTS

Figure 5:
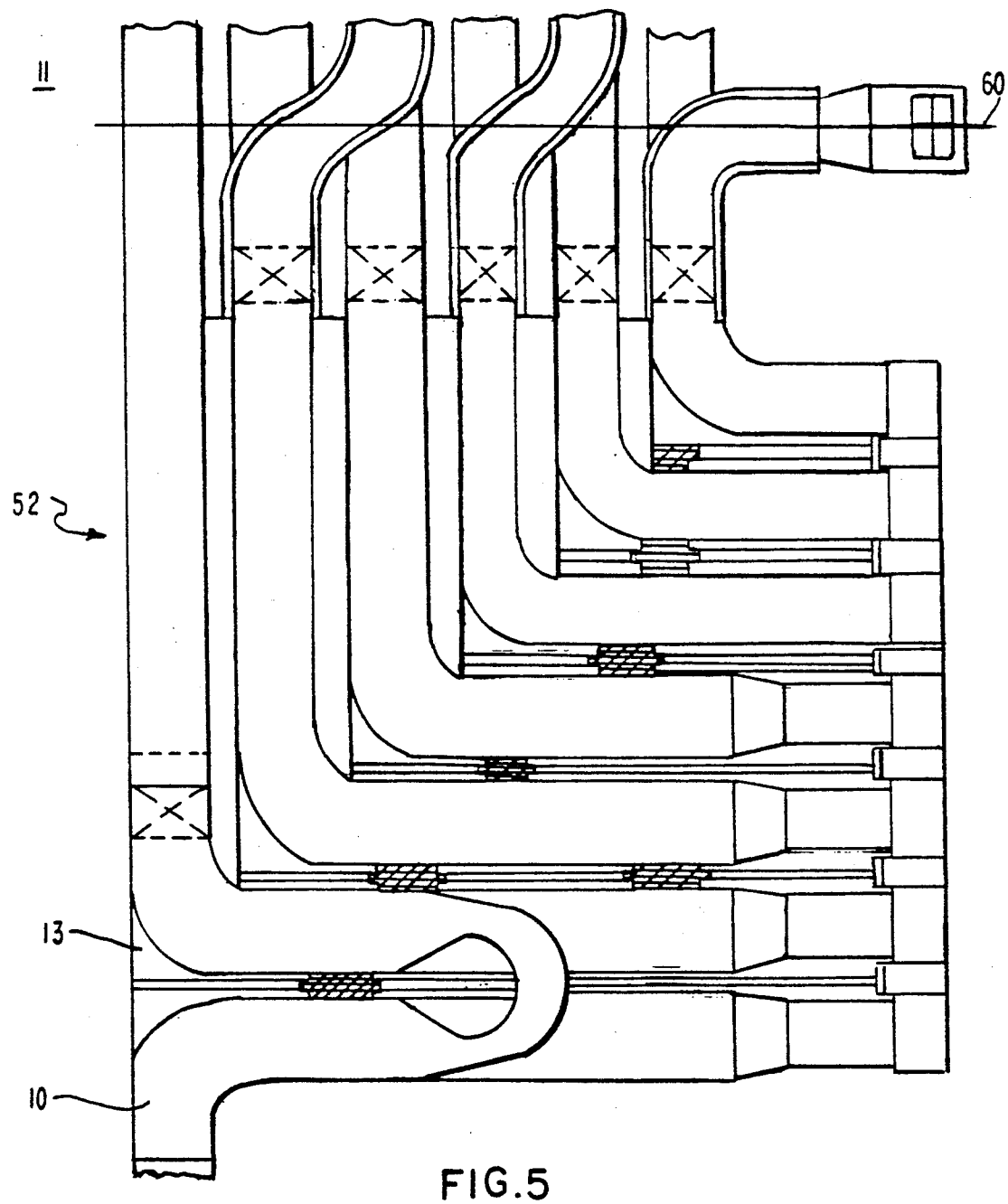
FIG. 5 is a side, partial view of a generator according to the present invention incorporating a crossover.

The present invention overcomes the above-discussed problems characteristic of known crossovers by providing a crossover which can be installed in a generator in the field by removing only the generator end plate, thereby limiting the risk of damage to generator insulation. Further, no modification is required to existing generator blocking.

More particularly, as shown in FIGS. 1-4, the crossover 10 of the present invention has a body 12 including first and second legs 14, 16 and a substantially U-shaped portion 26 therebetween. The crossover 10 is preferably made of solid quarter hard copper.

Each leg 14, 16 includes generally, beginning where the legs 14, 16 and the U-shaped portion 26 merge, i.e., at areas 22, 24: a first linear and parallel portion 18, 20; an outwardly curved portion 28, 30, extending from the first linear portion 18, 20; and a second linear portion 32, 34 extending from the curved portion 28, 30, substantially perpendicular to the first linear portion 18, 20 and terminating in a free end 36, 38, respectively. In this embodiment, the second linear portion 34 is shorter than the other second linear portion 32. A space 44 is formed between the first linear portions 18, 20 of the two legs 14, 16.

At the free end 36 is a scarf joint 40. As shown in FIG. 3 and 4, the scarf joint 40 is tapered. The angle of the taper is not critical. A small angle is preferred to maximize surface area of the scarf joint 40. At the other free end 38 is a lap joint 42. As shown in FIGS. 2-4, the lap joint 42 has a rectangular cross-section.

Although the FIGURES herein illustrate the preferred embodiment including a scarf joint 40 on the left side (as seen in FIG. 1) and a lap joint 42 on the right side, the invention should not be so limited. The respective joints 40, 42 are dictated by whether the winding is clockwise or counterclockwise, as would be known by those of ordinary skill in the art. Further, in certain circumstances dictated by unusual generator construction, it might even be desired to use two scarf joints or two lap joints, while still benefitting from the improved flexibility and reduced stress provided by the characteristics of the U-shaped portion 26 and the long legs 14, 16 described herein.

Dimensions for the crossover 10 according to the present invention follow. However, it is to be understood that these dimensions are illustrative only, as different generator styles/designs will dictate different dimensions.

As shown in FIGS. 1 and 2, the U-shaped portion 26 of the body 12 includes a curved inner wall 46 having a .59 inch radius, and a curved outer wall 48 having a 1.03 inch radius. Just above the areas 22, 24, there is included a radius of about .5 inches. The inner radius at the curved portions 28, 30 of the legs 14, 16 is 1.25 inches. The outer radius of the curved portions 28, 30 is 2.38 inches.

Beginning at the areas 22, 24, the U-shaped portion 26 thins in the radial direction "X" relative to a leg 14, 16 thickness "Z", but thickens in the top to bottom direction "y". This thickness change creates flexibility but maintains the same cross sectional area of copper for electrical conduction purposes.

More particularly, the rectangular cross section leg dimensions are .88 (the dimension shown by "Z" in FIG. 1), by .22 inches. In contrast, the distance between the inner wall 46 and outer wall 48 at the upper end of the U-shaped portion 26, i.e. "X" is from about .5 to a little less than .44 inches thick. Further, the top to bottom thickness "Y" is about .56 inches. Basically, relative to the legs 14, 16, one dimension is about halved and the other dimension is about doubled in the U-shaped 26 portion, which is preferred from a resistance point of view.

The distance from the areas 22, 24 to a parallel line tangential to the top of the outer wall 48 is 1.59 inches. The space 44 between the first linear portions 18, 20 is .82 inches wide.

The overall height of the crossover 10 is about 6 inches. The distance between the left side of the first linear portion 18 and a line extending along the free end 36 is 5 inches. The length of the scarf joint 40 makes up about 2 inches of this distance. The distance between the right side of the first linear portion 20 and a line extending along the other free end 38 is 3 inches. The legs 14, 16 are intentionally oversized so that they can be modified to fit in the field.

After final machining to the specifications discussed above, the crossover 10 is rolled to a diameter corresponding to the diameter of the copper coils of the winding to further prevent stress, and is then finished to about 63 microinch all over.

Thus, important aspects of the present invention are that the U-shaped portion 26 of the crossover 10 has increased flexibility due to a reduced thickness in one direction, increased thickness in another direction and an increased radius, as compared with, e.g. the known constant thickness, laminated crossover, merely including a U-shaped portion with legs extending therefrom. Such a constant thickness relatively smaller radius crossover is susceptible to cracking.

In addition to increased flexibility, the present invention exhibits reduced stress. Flexibility and reduced stress usually go hand-in-hand. However, some attempts to design a component with greater flexibility over-stress the component. The present invention avoids this problem.

Replacement of a cracked crossover on-site will now be described. Take, for example, the case where a known reverse S-shape crossover has become cracked. Such a crossover usually includes one scarf joint and one lap joint at respective free ends, connected to the winding ends by brazing. Only the end plate of the generator need be removed to expose an area of the winding 52 including the cracked crossover. This is usually done by heating the retaining ring and pulling off the end plate. Then, a cutting tool or hack saw blade (not shown) is inserted under the axially outermost conductor coil of the winding on the exciter end of the generator closest to the shaft, and the connections between the old crossover and the winding ends 54, 56 are severed. Alternatively, the connections are un-brazed.

In either case, the old scarf joint 58 should be maintained. The old crossover is then removed.

A new crossover 10 according to the present invention is inserted in place of the old crossover so that the crossover 10 is oriented axially relative to the shaft with the thickened area of the U-shaped portion (illustrated by "Y" in FIG. 2) extending downward toward the shaft (see FIGS. 3 and 4). Since there is a space between the shaft and the winding 52 at this area on the order of several inches, the crossover 10 does not abut the shaft. The actual taper of the scarf joint 40 of the crossover 10 is made in the field before connection of the crossover 10 to correspond to the scarf joint 58 formed on the winding end 54. That is, the installer customizes the scarf joint 40 of the crossover 10 using a file, etc.

The crossover 10 is then connected at its respective scarf and lap joints 40, 42 to the winding ends 52, 54. Connection is made via brazing. That is, braze 50 is placed between the joints 40, 42 and the winding ends 52, 54, respectively, and this area is heated to effect a connection.

As shown in FIGS. 3 and 4 the tapered scarf joint 40 accommodates the extra piece of conductor coil forming the winding end 54 at one of the old crossover connections. The purpose of the scarf joint 40 is to keep the crossover 10 on one level to be able to better withstand the centrifugal forces. As also shown in FIGS. 3 and 4, the lap joint 42 abuts underneath the opposite winding end 56, which does not include the extra piece of conductor coil.

FIG. 5 shows one of the crossovers 10 installed in a generator 11. The generator 11 includes a shaft 13, the winding 52 and a pair of poles (not shown), the longitudinal center line 60 of one being shown. As known in the art, two poles, north and south, are created by the windings 52 during operation of the generator 11.

Although the above description emphasizes on-site replacement of cracked crossovers with the crossover 10 according to the present invention, the present invention can also be used in original generator manufacture or rewinds. In either case, the crossover is put in before the outermost axial conductor coil is laid. The flexibility of the present invention is a distinct benefit in a new generator or rewind, since this design will not crack during use, so the need for replacement thereof would be eliminated.

The above-described crossover 10 of the present invention is sturdy and yet flexible enough to solve the earlier problems encountered with relatively short, i.e., flat plates or reverse S-shaped, crossovers. The flexibility and reduced stress are gained through the long legs 14, 16 and the increased inner radius of the U-shaped portion 26 of the crossover 10.

Further, this invention provides improved cyclic duty. For example, whereas the known crossovers might have a useful life of several thousand startups/shut downs, the present invention's useful life is hundreds of thousand of cycles.

The foregoing is considered illustrative only of the principles of the invention. Further, since numerous modifications and changes will readily occur to those skilled in the art, it is not desired to limit the invention to the exact construction and operation shown and described. For example, the present invention could also be used with electrical motors, which also include windings. Accordingly, all suitable modifications and equivalents may be resorted to that fall within the scope of the invention and the appended claims.

We claim:

1. A rotor pole crossover for a generator having a shaft and a winding around said shaft, said crossover, comprising:
   a body having first and second legs of a certain thickness and width joined by a substantially U-shaped portion,
   wherein said substantially U-shaped portion includes a first open end, a second closed end, a top and a bottom, said bottom being arranged to face said shaft, and
   wherein the substantially U-shaped portion thins from the first end to the second end relative to the width of the legs, but thickens from top to bottom, relative to the thickness of the legs.

2. The crossover as recited in claim 1, wherein each first and second leg comprises:
   a first linear and parallel portion which begins at an area where each leg merges with the substantially U-shaped portion, an outwardly curved portion extending from the first linear portion, and a second linear portion extending from the curved portion, substantially perpendicular to the first linear portion and terminating in a free end.

3. The crossover as recited in claim 2, wherein the free end of the first leg comprises a scarf joint and the free end of the second leg comprises a lap joint.

4. The crossover as recited in claim 1, wherein the crossover is solid.

5. A generator, comprising:
   a shaft;
   a winding around said shaft;
   a rotor pole crossover oriented axially relative to the shaft and connecting ends of the winding, said crossover including a body having first and second legs of a certain thickness and width joined by a substantially U-shaped portion,
   wherein said substantially U-shaped portion includes a first open end, a second closed end, a top and a bottom, said bottom being arranged to face said shaft,
   wherein the substantially U-shaped portion thins from the first end to the second end relative to the width of the legs, but thickness from top to bottom, relative to the thickness of the legs.

6. The generator as recited in claim 5, wherein each of the first and second legs comprises:
   a first linear and parallel portion which begins at an area where the leg merges with the substantially U-shaped portion, an outwardly curved portion extending from the first linear portion, and a second linear portion extending from the curved portion, substantially perpendicular to the first linear portion and terminating in a free end.

7. The generator as recited in claim 6, wherein the free end of the first leg comprises a scarf joint and the free end of the second leg comprises a lap joint.

8. The generator as recited in claim 5, wherein the crossover is solid.

9. A method for replacing an original rotor pole crossover of a generator having a shaft with a longitudinal axis, and a winding around said shaft, said crossover being connected to the winding ends with a new crossover, comprising the steps of:
   (a) removing an end plate of the generator;
   (b) disconnecting the original crossover from the winding ends;

(c) inserting the new crossover in place of the original crossover, said new crossover including a body having first and second ends, the first end including first and second legs, and the second end including a substantially U-shaped portion, an axis being defined in the direction from the first end to the second end, wherein said first and second legs have a certain thickness and width and are joined by the substantially U-shaped portion, wherein said axis of said body is parallel to said longitudinal axis of the shaft;

wherein said substantially U-shaped portion includes a first open end, a second closed end, a top and a bottom, said bottom being arranged to face said shaft, and wherein the substantially U-shaped portion thins from the first open end to the second closed end relative to the width of the legs, but thickens from top to bottom, relative to the thickness of the legs;

(d) connecting the new crossover by scarf and lap joints, respectively, to the winding ends; and (e) replacing the end plate of the generator.

10. The method as recited in claim 9, wherein step (d) comprises the substep of connecting the legs of the crossover to the winding ends by a scarf and lap joint, respectively.

11. The method as recited in claim 10, wherein step (d) includes the substep of brazing the scarf and lap joints to the winding ends.

* * * * *